United States Patent [19]

Marek et al.

[11] Patent Number: 5,569,852
[45] Date of Patent: Oct. 29, 1996

[54] CAPACITIVE ACCELEROMETER SENSOR AND METHOD FOR ITS MANUFACTURE

[75] Inventors: Jiri Marek, Reutlingen; Frank Bantien, Ditzingen; Horst Muenzel, Reutlingen; Michael Offenberg, Tuebingen, all of Germany

[73] Assignee: Robert Bosch GmbH, Stuttgart, Germany

[21] Appl. No.: 355,760

[22] Filed: Dec. 14, 1994

[30] Foreign Application Priority Data

Jan. 5, 1994 [DE] Germany .................... 44 00 127.4

[51] Int. Cl.⁶ .................................................. G01P 15/125
[52] U.S. Cl. .................................. 73/514.32; 73/514.16; 361/280
[58] Field of Search .................... 73/514.32, 514.16, 73/514.17, 514.18; 361/280, 281, 290

[56] References Cited

U.S. PATENT DOCUMENTS

| | | | |
|---|---|---|---|
| 4,663,972 | 5/1987 | Gérard | 73/517 R |
| 4,711,128 | 12/1987 | Boura | 73/517 B |
| 4,893,509 | 1/1990 | MacIver et al. | 73/517 AV |
| 5,025,346 | 6/1991 | Tang et al. | 361/283 |
| 5,345,824 | 9/1994 | Sherman et al. | 73/514.32 |
| 5,447,067 | 9/1995 | Biebl et al. | 73/514.32 |
| 5,447,068 | 9/1995 | Tang | 73/514.32 |

FOREIGN PATENT DOCUMENTS

WO92/03740  3/1992  WIPO .................... G01P 15/125

*Primary Examiner*—Hezron E. Williams
*Assistant Examiner*—Richard A. Moller
*Attorney, Agent, or Firm*—Kenyon & Kenyon

[57] ABSTRACT

A contacting of a capacitive accelerometer sensor of monocrystalline material is achieved by a capacitive accelerometer sensor having a structure etched out of a monocrystalline layer arranged on a substrate, including a seismic mass that is only joined to the substrate by suspension segments and executing a movement in its longitudinal direction in response to the occurrence of an acceleration of parallel, plate-like first fingers extending out from this mass at right angles to their longitudinal direction and of plate-like second fingers running parallel to the first fingers and anchored to the substrate. The first and second fingers form a capacitor arrangement. The suspension segments, which are anchored with their end region that is distant from the seismic mass to the substrate, and second fingers are electrically isolated, by an isolation strip, from the other remaining layer of monocrystalline material. A passivation layer extends over the isolation strip, and at least partially over the remaining layer. Conductors arranged on the passivation layer and serving as connecting leads for the capacitor arrangement extend across the isolation strip up to the connections of the capacitor arrangement, and are contacted there.

9 Claims, 1 Drawing Sheet

CAPACITIVE ACCELEROMETER SENSOR AND METHOD FOR ITS MANUFACTURE

FIELD OF THE INVENTION

The present invention relates to a capacitive accelerometer sensor and a method for manufacturing such an accelerometer sensor.

BACKGROUND INFORMATION

Accelerometer sensors produced in silicon micromechanics are used nowadays in many different ways. For example, they are used in motor vehicles to release air bags, for belt tighteners, in anti-lock systems, and the like.

In the case of an accelerometer sensor of this type, as described in U.S. Pat. Nos. 4,711,128 and 4,663,972, the resiliently suspended seismic mass and the plates disposed to fit into one another to form a capacitor or rather a capacitive accelerometer sensor are made of monocrystalline silicon or quartz. The structure is first produced by anisotropic etching of trenches and then dissolved from the substrate by means of isotropic undercutting. The disadvantage of this arrangement is that during the isotropic undercutting, the material is removed from both sides, essentially in a semicylindrical form, through which means only very narrow structures can be undercut, so that the width and thus the mass of the seismic mass is limited. Furthermore, in the case of a realization in monocrystalline silicon, the contacting of the required sensor supply leads is problematic.

In the case of the accelerometer sensor described in PCT Patent Publication No. WO 92/03740, which is produced using surface micromechanics means, the capacitor structures and the suspension segments, in particular, consist of polycrystalline silicon. The disadvantage of a polycrystalline material lies in the restricted activating capacity of dopants. Especially in the case of sensors in the low-acceleration range, the suspension segments for the seismic mass must have a very long and thin design. However, to achieve high conductivity, a high level of doping is required. The component of dopant material, which is introduced into the grain boundaries of the polycrystalline material and, consequently, is not electrically activated, contributes to an increased compressive stress and, given a concentration gradient, also to a voltage gradient. This can result in a warping of the suspension segments that are fixed on two sides and cause curvature of the capacitor plates.

SUMMARY OF THE INVENTION

The accelerometer sensor according to the present invention avoids the described disadvantages of polycrystalline material by using monocrystalline material for the sensor structure. Thus, large working capacities can be achieved, and an integration with an evaluation circuit is easily possible. Here, a cost-effective and simple-to-realize type of contacting of the sensor leads is proposed.

Two advantageous possibilities present themselves for forming the isolation strip: On the one hand, it can be produced by means of a p-diffusion in a layer including an n-type silicon and, on the other hand, it can be formed by a filled, isotropically or anisotropically etched trench. The etched trench is expediently provided with an insulating layer below the filling, which preferably includes polycrystalline material, for example, polysilicon. Thus, an electrical isolation is simply achieved.

The end regions of the second fingers fixed to the substrate are expediently connected to one another by at least one cross bar, the cross bar being formed as a connection for the capacitor arrangement. As a result, all that is needed, for example, is one contacting of these fingers on each side of the seismic mass.

To be able to manufacture large and wide seismic masses of monocrystalline material, the substrate is advantageously etched away on the rear side in the middle region of the accelerometer sensor, a frame area being provided or remaining, which retains the end regions of the suspension segments and two fingers. This rear-sided etch removal makes it possible to dispense with undercutting, which is particularly problematic when wide areas of monocrystalline silicon have to be undercut.

Best suited as a substrate is p-type silicon, and the remaining layer, as well as the etched-out structure, preferably includes n-type silicon.

One advantageous method for manufacturing an accelerometer sensor of this type is where an isolation strip surrounding the region of the structure to be produced later is initially formed in the layer covering the substrate. The isolation strip and at least the area of the layer not surrounded by it are then provided with a passivation layer. Then, in any desired sequence, the structure including the mass, the suspension segments and the fingers is formed by means of anisotropic etching (trench etching); the conductors are applied to the passivation layer, their end regions leading up to the connections of the capacitor arrangement are contacted, and the substrate is etched away below the middle-region of the structure on the rear side. Thus, in a simple manner, one also obtains wide structures of monocrystalline silicon and a simple and advantageous contacting.

To form the isolation strip, either an appropriately localized p-diffusion is carried out, or a trench is initially isotropically or anisotropically etched, then provided with an insulating layer, and finally filled up at least in the connection areas, preferably through deposition of polysilicon.

The etching on the rear side can be performed very precisely using a p/n-etching stop.

DETAILED DESCRIPTION

Figure 1:
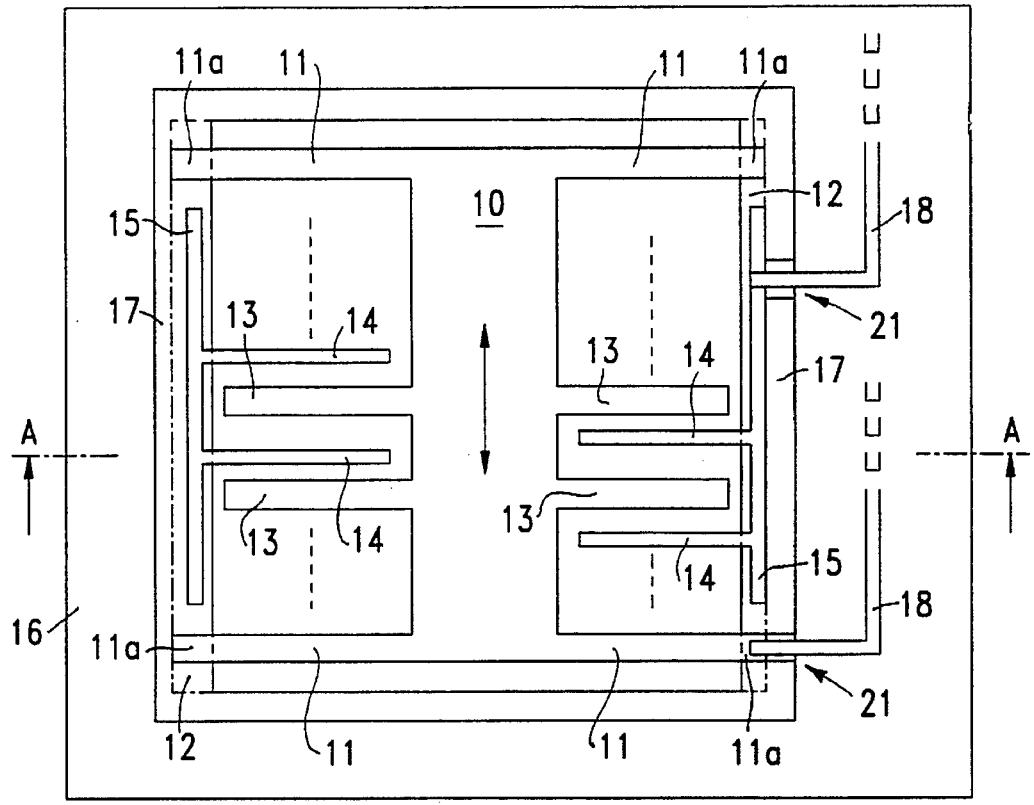
FIG. 1 shows a top view of an accelerometer sensor in an exemplary embodiment of the present invention.

The accelerometer sensor depicted in the top view in FIG. 1 includes a band-shaped seismic mass 10 of monocrystalline silicon (n-type silicon). Running from both of its ends, in each case perpendicularly to the longitudinal direction toward both sides, are thin suspension segments 11, which are formed in one piece with the mass 10 and whose end regions 11a that are distant from the mass 10 are fixed to the substrate of monocrystalline silicon surrounding the sensor region. In this manner, the seismic mass 10 can move in its longitudinal direction, in response to the occurrence of corresponding accelerations, relatively to the substrate 12 in the direction of the arrow.

Thin, elongated first fingers 13 designed as capacitor plates are preshaped in one piece on both longitudinal sides of the seismic mass 10, perpendicularly to the longitudinal direction of the seismic mass 10. They likewise include a monocrystalline n-type silicon. Running between these first fingers 13, fitting into one another in each case in the manner of fingers, are additional second fingers 14, which are designed as capacitor plates and are affixed at their end facing away from the seismic mass 10 to the substrate. They are connected to one another there via cross bars 15, which are preshaped in one piece, in each case on both sides of the seismic mass 10 on the substrate 12. The fingers 13, 14 are thus designed in the manner of bars that are fixed on one side. The first and second fingers 13, 14, which fit into one another, form a capacitor arrangement, whose capacitance changes in the case of a longitudinal displacement of the seismic mass 10, thus allowing the acceleration to be detected through the changing capacitance.

The dotted line is drawn as a simplified representation of more of such fingers 13, 14 in a parallel arrangement.

A layer 16 of monocrystalline n-type silicon on the substrate 12 surrounds the sensor structure in a frame shape. The sensor structure is separated from this in a frame shape by a narrow isolation strip 17 (for example, strip width<2 μm, strip height>10 μm), i.e., the suspension segments 11, the fingers 13, 14 and the cross bars 15 are arranged so as to be set apart on all sides from the surrounding layer 16 of the same material. This isolation strip 17 is filled up to allow conductors 18 serving as connection lines of the capacitor arrangement on the layer 16 to lead to the capacitor arrangement. In principle, this filling can also only be present at the required locations. In this case, the one conductor is contacted by one of the end regions 11a of one of the suspension segments 11, and an additional conductor is contacted by one of the cross bars 15. Of course, the other cross bar 15 can also be contacted accordingly by a conductor 18, this having been left out to simplify the representation. This contacting will be clarified in still greater detail in conjunction with FIG. 3.

Figure 2:
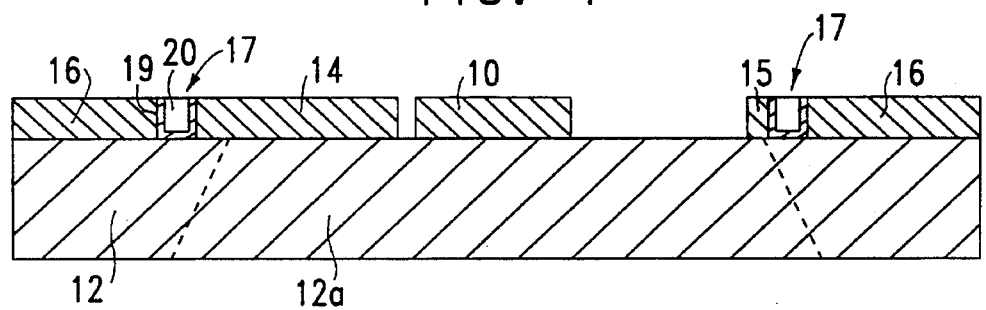
FIG. 2 shows a sectional view of the accelerometer sensor subsequent to the etching of the trench for the isolation strip and the middle sensor structure, through the line A—A in FIG. 1.
Figure 3:
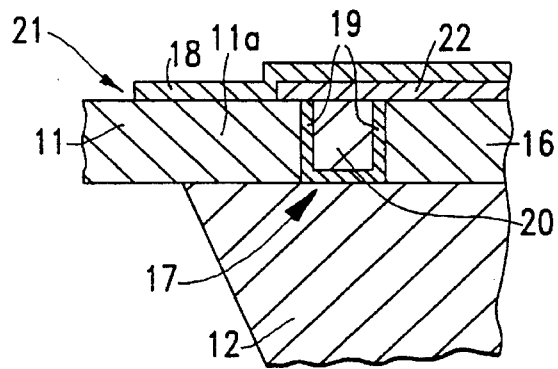
FIG. 3 shows an enlarged sectional view of the sensor through a contacting region.

The manufacturing method will be clarified in the following also on the basis of FIGS. 2 and 3.

A layer of n-type silicon, out of which the layer 16 and the sensor structure are later formed by means of etching, is initially applied in the usual way to a plate of monocrystalline p-type silicon forming the substrate 12. The doping can be carried out according to known methods before or during the process. Initially, the frame-shaped isolation strip 17 is formed in the upper layer by means of isotropic or anisotropic etching as a trench which reaches down to the substrate 12. This trench is then provided with an insulating layer 19 in accordance with FIG. 3, the trench having been produced in accordance with FIG. 3 by means of anisotropic trench etching. The insulating layer 19 can consist, for example, of silicon dioxide. The trench is subsequently filled by depositing, for example, polycrystalline silicon as a filling 20. This filling operation can be carried out completely or only at the connection areas 21 to be formed later.

The entire layer is initially provided with a passivation layer 22, which is removed again later in the inner region of the sensor structure, so that it extends over the isolation strip 17 and still slightly overlaps the layer inside the isolation strip 17.

At this point, the conductors 18 in accordance with FIG. 1 are applied to the layer 16, i.e., to the passivation layer 22. They extend across the isolation strips 17 up to one or two cross bars 15 and are contacted there at a location that does not have a passivation layer 22. The substrate 12 is then removed in the area of the sensor structure by means of rear-sided etching with a p/n-etching stop. The removed area 12a b is characterized in FIG. 2 by cross-hatched shading. At this point, the sensor structure, namely the seismic mass 10, the suspension segments 11, the fingers 13, 14, and the cross bars 15, are formed by means of anisotropic trench etching. FIG. 2 depicts the accelerometer sensor in accordance with this manufacturing step. As a result of this etching, the sensor structure is still retained only at the end regions 11a of the suspension segments 11 and at the end regions of the second fingers 14, or at the cross bars 15 at the end area of the cut-away portion of the substrate 12.

The further pattern of the conductor 18 is no longer shown in FIG. 1, and is indicated only by a dotted line.

One can also vary the sequence of the process steps, i.e., the etching of the sensor structure, the rear-sided etching of the substrate 12, and the application of the conductor 18.

Alternatively to the described formation of the isolation strip 17, it can also be produced by means of a p-diffusion in an appropriate strip. A filling operation is not required in this case. Also, such a p-diffusion strip makes it possible for an electrical insulation to be achieved between the sensor structure and the outer area of the layer 16.

The conductors can be produced, for example, by means of vapor deposition with aluminum or with another material having good conducting properties. Such conductors can also be produced by deposition of a layer.

The monocrystalline layer 16 can also be provided with an evaluation circuit for the accelerometer sensor in a manner not shown and with the help of a standard process, so that the sensor and the evaluation circuit are arranged on one component part.

What is claimed is:

1. A capacitive accelerometer sensor having a structure etched out of a conductive monocrystalline layer arranged on a substrate, comprising:

a seismic mass movable in a longitudinal direction in a plane of the seismic mass in response to an occurrence of an acceleration;

suspension segments coupling the seismic mass to the substrate, the suspension segments being coupled at first ends to the seismic mass and at second ends to the substrate, the suspension segments being coupled such that the seismic mass is movable in the longitudinal direction;

parallel, plate-like first fingers extending from the seismic mass at substantially right angles to the longitudinal direction;

plate-like second fingers, running parallel and opposed to the first fingers, and being coupled at first ends to the substrate;

an isolation strip electrically isolating the second fingers and the suspension segments from a surrounding layer of the conductive monocrystalline layer;

a passivation layer extending over the isolation strip and at least partially over the surrounding layer; and conductors arranged on the passivation layer and running across the isolation strip, the conductors being coupled to the second fingers and the suspension segments.

2. The sensor according to claim 1, wherein the isolation strip is formed from a p-diffusion in a layer including n-type silicon.

3. The sensor according to claim 1, wherein the isolation strip is formed by an at least partially filled trench, the trench being at least one of isotropically and anisotropically etched.

4. The sensor according to claim 3, wherein the trench is provided with an insulating layer prior to filling.

5. The sensor according to claim 4, wherein the filling is composed of polycrystalline material.

6. The sensor according to claim 5, wherein the polycrystalline material is polysilicon.

7. The sensor according to claim 1, further comprising:
 at least one cross bar, for coupling the first ends of the second fingers, the at least one cross bar being formed as a first connection for the capacitor arrangement.

8. The sensor according to claim 1, wherein the substrate is etched away on a rear side in a middle region, such that a remaining frame area of the substrate is provided for retaining the second ends of the suspension segments and the first ends of the second fingers.

9. The sensor according to claim 1, wherein the substrate is composed of p-type silicon, and the surrounding layer and the sensor structure are composed of n-type silicon.

* * * * *